Nov. 17, 1970   E. V. LOFGREN   3,540,266
POSITIVE MECHANICAL WELD TRACKER
Filed Oct. 3, 1967   2 Sheets-Sheet 2
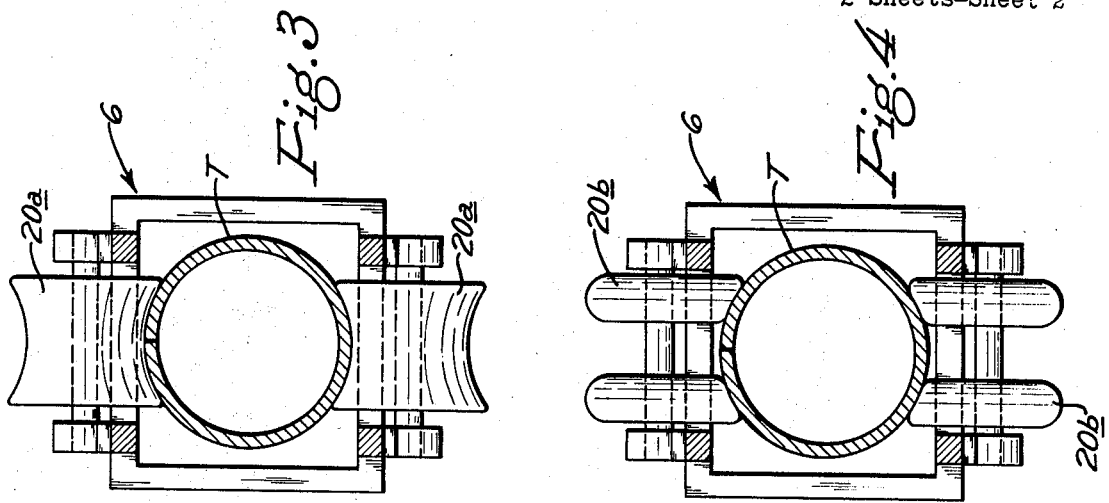
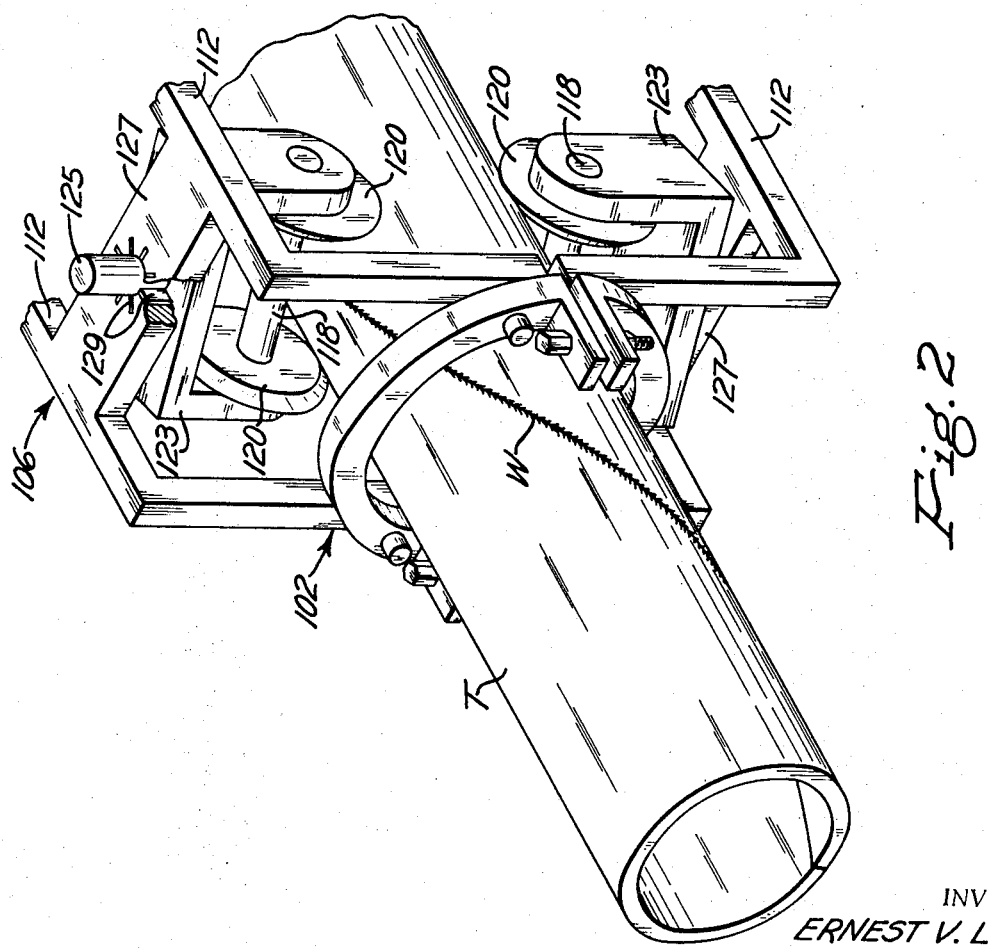
INVENTOR.
ERNEST V. LOFGREN
BY
Donald J. Dalton
ATTORNEY.

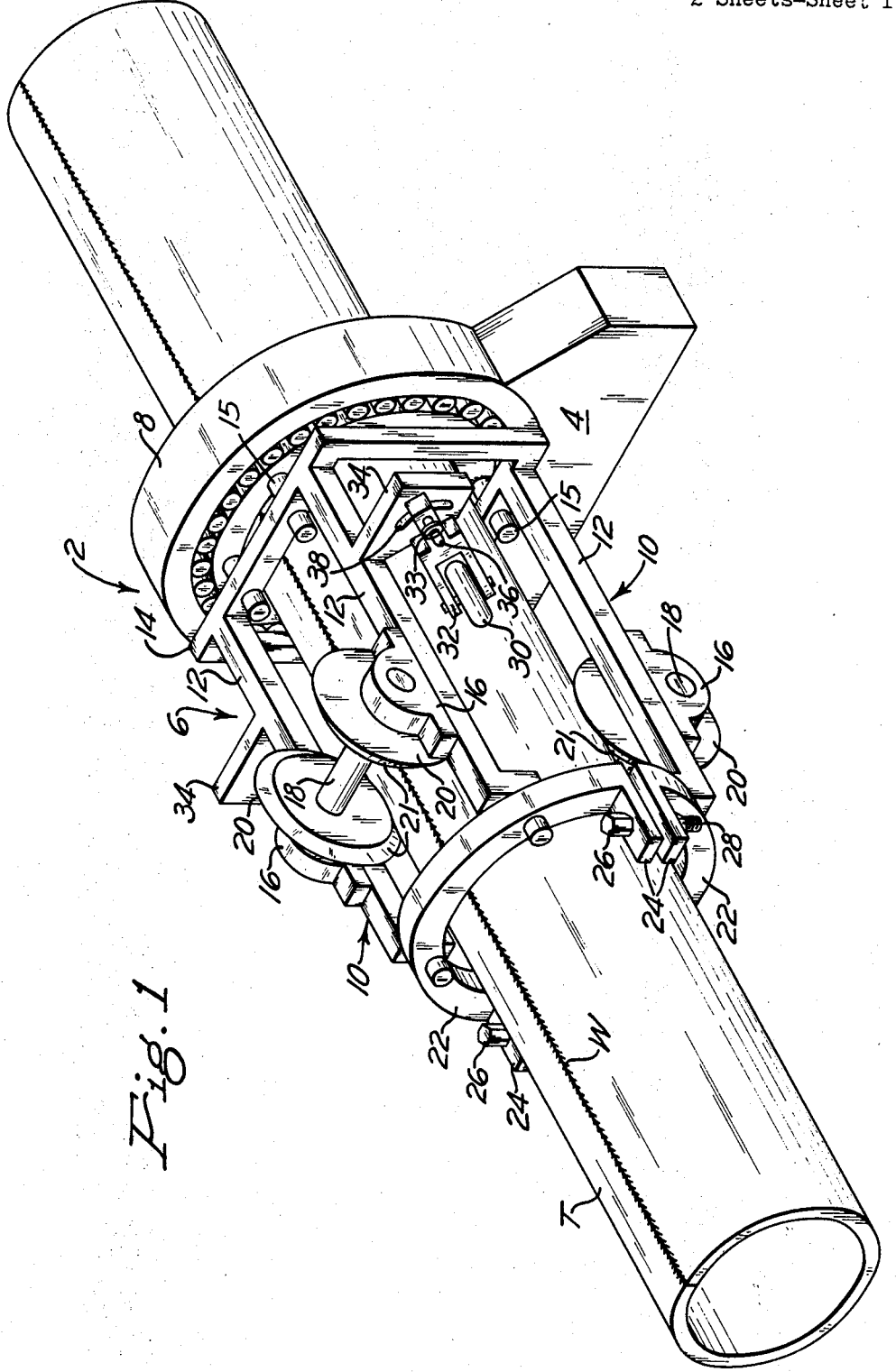

United States Patent Office 3,540,266
Patented Nov. 17, 1970

3,540,266
POSITIVE MECHANICAL WELD TRACKER
Ernest V. Lofgren, Satellite Beach, Fla., assignor to United States Steel Corporation, a corporation of Delaware
Filed Oct. 3, 1967, Ser. No. 672,617
Int. Cl. G01n 29/04
U.S. Cl. 73—67.8     4 Claims

ABSTRACT OF THE DISCLOSURE

An apparatus for tracking a weld which extends longitudinally along a moving elongated cylindrical workpiece. The apparatus tracks by a purely mechanical means, while supporting a transducer or other weld inspection means over the weld. The path of the weld may be either straight or helical.

---

This invention relates to apparatus for the nondestructive testing of a weld extending longitudinally along a workpiece. More particularly, it relates to an apparatus that will track and test the weld area of welded pipes and tubes.

In one example of the non-destructive testing of welds, ultrasonic waves are introduced into the welded tube by a search unit spaced at a given angular distance from the weld. As the tube is moved longitudinally relative to the search unit, defects in the weld will reflect the ultrasonic waves, and these reflections will be sensed by the search unit. Accurate reading of these reflections, however, is dependent on maintaining the search unit at a fixed distance and position with respect to the weld. It is difficult to hold the distance between the search unit and the weld within the desired tolerances, because the tubes must be fed by the search unit at a high rate of speed to maintain an efficient rate of production, and the tubes often wander or rotate during inspection.

In other methods of testing welds, such as electromagnetic inspection or eddy current inspection, where the probe is held directly over the weld, the same problem of the tubes wandering exists.

The presently known types of apparatus for supporting a search unit a fixed distance from a weld on a moving tube rely on sensing the differences in the optical, mechanical, or magnetic properties of the weld relative to the properties of the body of the tube. One of the problems of trying to sense these differences is that the properties of the weld area are so similar to the properties of the tube body that expensive and sophisticated instruments are required to distinguish them. Another problem is that the weld area is often wider than the permissible tolerance in the distance between the weld and the search unit. This wide weld area allows the search unit to wander outside the permissible tolerance and give unsatisfactory test readings.

It is therefore an object of my invention to provide apparatus for tracking welds of welded tubing that will not rely on a difference between a property of the weld area and a corresponding property of the tube body. The tracking means provided by my invention is of the mechanical type and maintains the search unit in a fixed position relative to the weld, regardless of how the tube wanders or rotates during the inspection.

It is also an object of my invention to provide apparatus that will track welds extending along a tube either in a straight line or in a helix.

These and other objects of my invention will appear more readily from the following detailed description of my invention, and the attached drawings in which:

FIG. 1 is a perspective view of apparatus for tracking welds, illustrating one embodiment of my invention;

FIG. 2 is a partial perspective view of apparatus for tracking welds, similar to that of FIG. 1 but illustrating another embodiment of my invention; and FIGS. 3 and 4 are end views of apparatus for tracking welds, showing modifications of my invention, which may be used with either of the embodiments of FIGS. 1 and 2.

The apparatus 2, shown in FIG. 1, comprises a stationary base support 4, and a frame 6 rotatably connected to the base support by a roller bearing 8. The inner race of roller bearing 8 and the frame 6 surround a tube T having a weld W to be inspected for cracks, seams or other defects.

The frame 6 has upper and lower horizontal legs 10. Each of these legs includes two beams 12, cantilevered from a rear frame member 14. Pins 15 connect the rear frame member 14 to the inner race of roller bearing 8. Pillow blocks 16 mounted on each beam 12 rotatably support the ends of shafts 18 carrying rollers 20. The rollers 20 are designed to be pressed into a rolling, non-slipping contact with the surface of tube T, so that as the tube T rotates during inspection, the frame 6 will rotate within roller bearing 8 and stay with the tube T.

To create as much rolling friction as possible between the rollers 20 and the surface of the tube T, the rollers 20 should be made of a non-slip type of material, such as the cloth-rubber composition used on V-belts. Edges 21 on the rollers 20 are conical-shaped, converging toward each other, and the rollers 20 on each shaft 18 are spaced so that the edges 21 are substantially tangent with the surface of tube T. As an alternative, contour rollers 20a (FIG. 3) may be used in place of each pair of rollers 20, but such contour rollers must match closely the curvature of the tube T, to insure a high-friction, non-slip contact between the rollers 20a and tube T.

Another type of roller is illustrated in FIG. 4. Air-inflated rubber tires 20b have the advantage of conforming to the surfaces of tubes of a variety of sizes. The more the tire is pressed to the tube surface, the greater its area of contact, and hence the greater its friction with the tube. This means less chance of the frame 6 slipping and rotating relative to the tube T. The inflatable tires 20b are particularly well suited for oily tube surfaces, since they tend to wipe the tube surface clean as they roll over the tube.

Connected to the free ends of cantilever beams 12 of each leg 10 is a half-ring member 22. The ends of each half-ring member 22 are designed to be clamped to the ends of the other member 22, so that the rollers 20 mounted on each leg will be tightened against the tube T. For this purpose, flanges 24 are provided on the ends of half-ring members 22, and bolts 26, secured with nuts 28, fit through holes in each pair of adjacent flanges 24.

An ultrasonic search unit 30 is mounted on the frame 6, and is shown in FIG. 1 fixed to one of the cantilever beams 12. The search unit 30 is a wheel type comprising a rubber tire filled with water and an ultrasonic crystal fixed to the wheel axle inside the tire. The wheel is mounted rotatably in a bifurcated holder 32, which in turn is secured by bolt 33 to flange 34 on beam 12. The bolt 33 fits through slot 36 in holder 32, enabling the wheel search unit 30 to be adjusted to ride in contact with the surface of tube T. An arcuate slot 38 in flange 34 permits the search unit to be spaced at a desired angular distance from the weld W on tube T.

The apparatus 102, partially shown in FIG. 2, may be used to track helical welds on tube T, as well as straight welds. The apparatus 102 differs from the apparatus 2 only in the portion shown in FIG. 2, the rear portion which contains the roller bearing and base being identical to apparatus 2 in FIG. 1.

The frame 106 is similar to frame 6 of FIG. 1, except that its beams 112 are spaced further from tube T than beams 12, to permit the addition of adjustable U-shaped roller support carriages 123. Rollers 120 are rotatably held by these support carriages 123. Pins 125 mounted on carriages 123 each slide through a hole in a cross member 127 mounted between each pair of beams 112. Fins 129 radiating from pins 125 slide in corresponding slots radiating from the holes in cross member 127. When it is desired to change the angle of rollers 120 to track a weld of a different helix angle, the carriages 123 are pulled to remove the fins 129 from their slots in cross member 127. Then the carriages are rotated to new positions in which the fins 129 are aligned with their slots. The carriages 123 are pushed back so that the fins 129 slide into the slots in cross member 127, thus locking the carriages 123 in their new positions.

While several embodiments of my invention have been shown and described herein, other modifications will be apparent within the scope of my invention as defined by the following claims.

I claim:

1. Apparatus for tracking a weld extending longitudinally along an elongated cylindrical workpiece, said apparatus comprising:
   a base support;
   a bearing mounted thereon providing relative rotational movement therebetween;
   a frame mounted on said bearing for rotation therewith and having two legs;
   a roller rotatably mounted on each of said legs of said frame, the rollers on said legs having parallel axes of rotation which are substantially perpendicular to said weld, and said rollers being located on opposite sides of the longitudnal wall of said workpiece;
   means connected to said legs forcing said legs toward each other so as to tighten said rollers against the opposite sides of the longitudinal wall of said workpiece, whereby said rollers will carry said rotatable frame over said workpiece, and said frame will stay with the rotation of said workpiece irrespective of the rotation of said workpiece, while said base support of said apparatus is moved longitudinally relative to said workpiece; and
   means mounted on said frame for inspecting said weld during relative movement of said workpiece longitudinally to said base support, said means being held in its desired position with respect to said weld with respect to any rotation of said workpiece.

2. Apparatus of claim 1 including:
   a roller carriage rotatably supporting each of said rollers, each roller carriage being mounted on one of said legs of said frame and rotatably adjustable about an axis perpendicular to the axis of rotation of said rollers,
   and means connected between said roller carriages and said frame for locking said roller carriages in fixed positions about their said axes of rotatable adjustment, so as to fix the axes of rotation of said rollers in positions perpendicular to said weld.

3. Apparatus of claim 1 wherein each of said rollers include two wheels with conical shaped edge surfaces converging in opposite directions and towards each other, said wheels being spaced apart at a distance such that said conical shaped edge surfaces are substantially tangent to said longitudinal wall of said workpiece, and when pressed thereagainst provide a rolling, non-slipping contact therewith, whereby said frame will stay with the rotation of said workpiece irrespective of rotation of said workpiece.

4. Apparatus of claim 1 wherein each of said legs of said frame includes a half-ring shaped member designed to fit concentrically around said workpiece, each of said half-ring shaped members having its ends juxtaposed to the ends of the other half-ring shaped member and having said means for forcing said legs toward each other connected between said ends, and thereby forcing said rollers against said workpiece when said legs are forced toward each other, whereby said frame will stay with the rotation of said workpiece irrespective of rotation of said workpiece.

References Cited

UNITED STATES PATENTS

| | | | |
|---|---|---|---|
| 3,056,285 | 10/1962 | Gibson et al. | 73—67.8 |
| 3,056,286 | 10/1962 | Gibson et al. | 73—67.8 |
| 3,077,768 | 2/1963 | Allardt et al. | 73—67.8 |
| 3,105,380 | 10/1963 | Stebbins | 73—67.8 |
| 3,121,325 | 2/1964 | Rankin et al. | 73—67.7 |
| 3,289,468 | 12/1966 | Van Der Veer et al. | 73—67.8 XR |
| 3,350,925 | 11/1967 | Coy | 73—67.8 XR |
| 3,413,843 | 12/1968 | Kortenhoven | 73—71.5 |
| 3,455,150 | 7/1969 | Wood | 73—75.1 |

FOREIGN PATENTS 185,534  6/1966  U.S.S.R.

RICHARD C. QUEISSER, Primary Examiner

A. E. KORKOSZ, Assistant Examiner